(12) United States Patent
Carbonell et al.

(10) Patent No.: US 8,743,204 B2
(45) Date of Patent: Jun. 3, 2014

(54) DETECTING AND MONITORING EVENT OCCURRENCES USING FIBER OPTIC SENSORS

(75) Inventors: Lee A. Carbonell, Flower Mound, TX (US); Jeffrey L. Edgington, Keller, TX (US); Pandian Mariadoss, Allen, TX (US)

(73) Assignee: International Business Machines Corporation, Armonk, NY (US)

( * ) Notice: Subject to any disclaimer, the term of this patent is extended or adjusted under 35 U.S.C. 154(b) by 649 days.

(21) Appl. No.: 12/986,570

(22) Filed: Jan. 7, 2011

(65) Prior Publication Data

US 2012/0176496 A1 Jul. 12, 2012

(51) Int. Cl.
*H04N 7/18* (2006.01)

(52) U.S. Cl.
CPC .................................. *H04N 7/181* (2013.01)
USPC .......................................... 348/154; 348/143

(58) Field of Classification Search
CPC ............. H04N 7/181; G08B 13/19602; G08B 13/19634
USPC ................................................. 348/142–160
See application file for complete search history.

(56) References Cited

U.S. PATENT DOCUMENTS

| 4,321,463 | A | | 3/1982 | Stecher |
| 4,777,476 | A | | 10/1988 | Dank |
| 4,829,286 | A | | 5/1989 | Zvi |
| 5,061,847 | A | | 10/1991 | Hazan et al. |
| 5,689,442 | A | * | 11/1997 | Swanson et al. ............ 380/241 |
| 5,857,190 | A | * | 1/1999 | Brown ................................. 1/1 |
| 6,980,108 | B1 | | 12/2005 | Gebbia et al. |
| 6,980,485 | B2 | | 12/2005 | McCaskill |
| 7,002,617 | B1 | | 2/2006 | Smith |
| 7,068,166 | B2 | * | 6/2006 | Shibata et al. .............. 340/541 |
| 7,109,873 | B2 | | 9/2006 | Giotto et al. |
| 7,123,785 | B2 | | 10/2006 | Iffergan |
| 7,142,736 | B2 | | 11/2006 | Patel et al. |
| 7,146,014 | B2 | | 12/2006 | Hannah |
| 7,619,647 | B2 | | 11/2009 | Wren et al. |
| 2006/0126738 | A1 | | 6/2006 | Boice et al. |
| 2007/0296813 | A1 | | 12/2007 | Hsieh |
| 2008/0267453 | A1 | | 10/2008 | Avrahami |

* cited by examiner

*Primary Examiner* — Andy Rao
(74) *Attorney, Agent, or Firm* — Patents on Demand P.A.; Brian K. Buchheit; Scott M. Garrett

(57) ABSTRACT

An event within a surveilled area, a physically bounded region, can be detected in real-time. The event can be outside the field of view of a camera associated with the surveilled area. The event can be detected by a fiber optic sensor within the surveilled area which can measure an event metrics. Event information associated with the event can be received which can include a timing information, a sensor measurement, and a location information. An adjustment operation associated with the camera can be determined utilizing a mapping and the event location. The adjustment operation can be associated with a camera functionality and an adjustment value. The mapping can include a camera identification value, a camera location, and a field of view dimension. The field of view of the camera can be adjusted dynamically which can result in the location of the event being within the field of view.

18 Claims, 3 Drawing Sheets

DETECTING AND MONITORING EVENT OCCURRENCES USING FIBER OPTIC SENSORS

BACKGROUND

The present invention relates to the field of surveillance and, more particularly, to detecting and monitoring event occurrences using fiber optic sensors.

Video footage from surveillance cameras can be an invaluable resource for preventing security breaches and maintaining/executing security measures. In many instances, however, it is often difficult and/or expensive to capture a video stream of a relevant event (e.g., activity) from an optimal point of view. Existing solutions utilize simple motion detection, simple trip wire motion detection, and dedicated security personnel. These solutions suffer from several drawbacks such as outdated and/or unreliable technology and human error.

With utilizing simple motion detection technology, only an event within the camera field of view can be captured. That is, an event occurring outside the field of view of the camera can be frequently missed. Similarly, simple trip wire motion detection is typically limited to small regions (e.g., surveilled areas), which can be costly to deploy over larger areas. Further, delays between motion detection and camera adjustment (e.g., pan, tilt, zoom) can cause an event to remain unobserved. Another approach includes utilizing personnel to monitor video streams and manually perform camera adjustments. While this approach has some success over other traditional solutions, the approach can be costly and error-prone.

BRIEF SUMMARY

One aspect of the present invention can include a method, a computer program product, a system, and an apparatus for dynamically adjusting a camera in response to detecting an event. In this aspect, an event within a surveilled area, a physically bounded region, can be detected in real-time. The event can be outside the field of view of a camera associated with the surveilled area. The event can be detected by a fiber optic sensor within the surveilled area which can measure an event metrics. Event information associated with the event can be received. The event information can include a timing information, a sensor measurement, and a location information. An adjustment operation associated with the camera can be determined utilizing a mapping and the event location. The adjustment operation can be associated with a camera functionality and an adjustment value. The mapping can include a camera identification value, a camera location, and a field of view dimension. The field of view of the camera can be adjusted dynamically. The adjusting can result in the location of the event being within the field of view. The adjusting can include a pan, a tilt, and a zoom.

Another aspect of the present invention can include a system apparatus for dynamically adjusting a camera in response to detecting an event. In this aspect, a surveilled area can include a physically bounded region and a fiber optic sensor within the surveilled area able to detect an event, wherein the fiber optic sensor can receive a measurement associated with the event, wherein the measurement can include a pressure, strain, and temperature. A surveillance engine can be able to identify a camera proximate to the event and communicate a camera adjustment operation to the proximate camera resulting in the modifying of the proximate camera state. The proximate camera with a field of view can be configured to convey a video stream within the surveilled area to a video management system. The video stream can include video information associated with the field of view. The proximate camera can be capable of an adjustment operation which can include a pan, tilt, and zoom functionality which modifies the field of view. A mapping can be capable of tracking the proximate camera state, which can include a camera identification value, camera location, and a camera field of view dimension.

DETAILED DESCRIPTION

Figure 1:
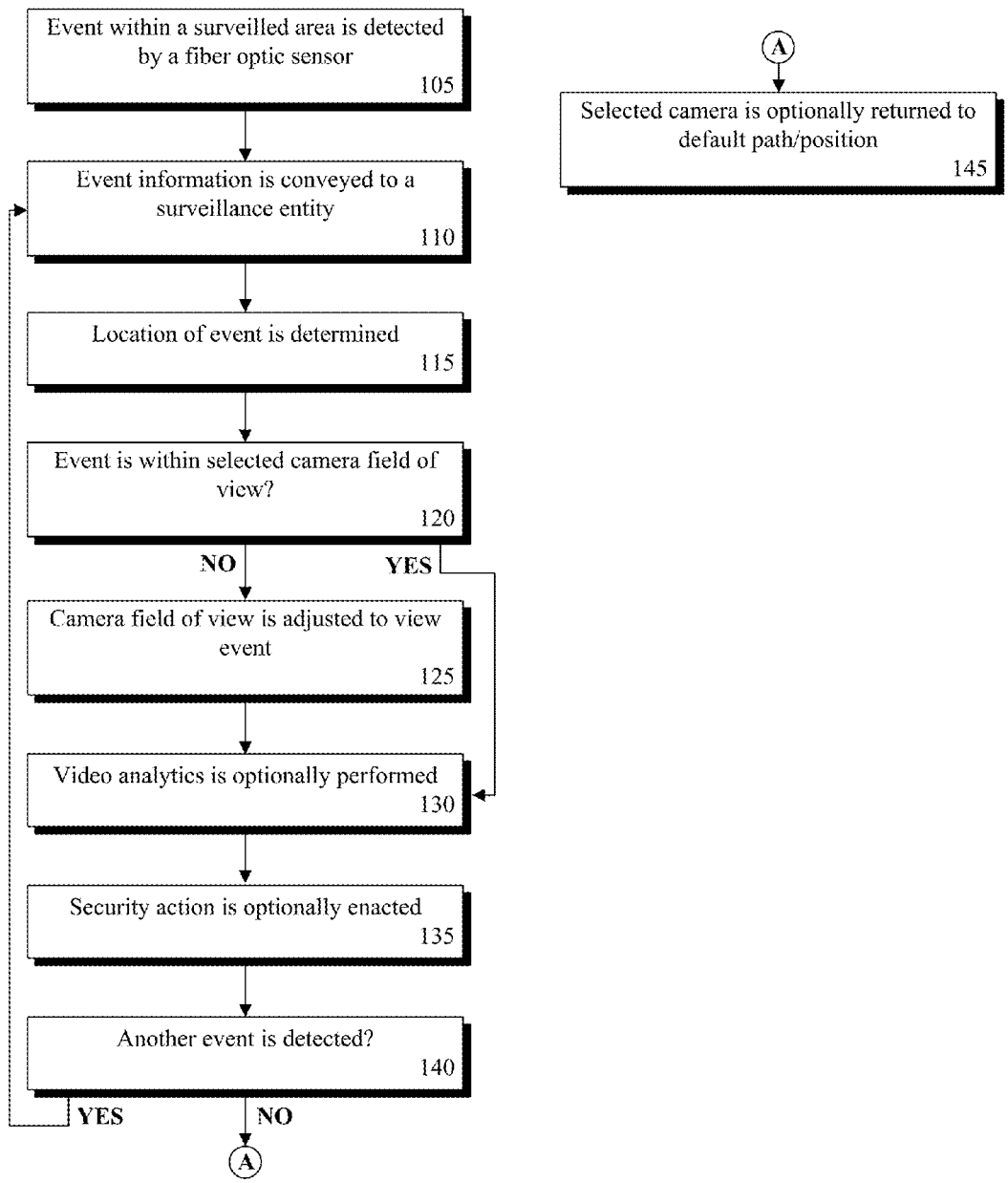
FIG. 1 is a flowchart diagram illustrating a method for detecting and monitoring event occurrences using fiber optic sensors in accordance with an embodiment of the inventive arrangements disclosed herein.

The present disclosure is a solution for detecting and monitoring event occurrences using fiber optic sensors. In the solution, fiber optic sensors located within a surveilled area can be receptive to an event occurrence. Event occurrence can include, but is not limited to, object presence (e.g., intruder), object motion (e.g., moving car), and the like. An event occurrence detection can be conveyed to a surveillance engine which can perform camera adjustments to capture the event occurrence. In one instance, camera adjustments can be performed when the event occurrence is outside the field of view of the camera. In the instance, the camera can be adjusted to place the event within the field of view of the camera. In one embodiment, camera tracking can be performed when an event occurs throughout a surveilled area.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction processing system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction processing system, apparatus, or device.

Program code embodied on a computer readable medium may be transmitted using any appropriate medium, including but not limited to wireless, wireline, optical fiber cable, RF, etc., or any suitable combination of the foregoing. Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions.

These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

FIG. 1 is a flowchart diagram illustrating a method 100 for detecting and monitoring event occurrences using fiber optic sensors in accordance with an embodiment of the inventive arrangements disclosed herein. In method 100, a camera (e.g., Internet Protocol camera) associated with a surveilled area can be adjusted in response to an event occurrence within the surveilled area. The event can be detected via fiber optic sensors associated with the surveilled area. For example, fiber optic sensors embedded within a walkway can be utilized to detect a pedestrian position in real-time. Event detection can trigger a camera pan, tilt, zoom functionality to permit optimal viewing of the event within the field of view of the camera. For example, when an event occurs outside a camera field of view, the camera can be adjusted to view the event based on event detection information.

As used herein, a camera can be a device capable of recording and/or storing images. The camera can include, but is not limited to, digital camera, analog camera, and the like. The camera can be, but is not limited to, video camera, still camera, surveillance camera, and the like. The camera can be a surveillance camera including, but is not limited to, an Internet Protocol (IP) camera, a Closed Circuit Television (CCTV) camera, and the like. The camera functionality can include, but is not limited to, pan, tilt, zoom, light amplification, visible spectrum functionality, non-visible spectrum capabilities, and the like. The camera can include, but is not limited to, stationary cameras, mobile cameras, and the like.

As used herein, surveillance can be the detecting and/or monitoring of an event within a surveilled area. The surveilled area can be a region associated with a camera and/or surveillance activity (e.g., electronic monitoring). The region can be a physical space bounded by one or more perimeters which can be visible by a camera. Surveilled area can include, but is not limited to, retail stores, residential buildings, commercial facilities, military installations, and the like.

In step 105, an event within a surveilled area can be detected by a fiber optic sensor. The fiber optic sensor can be an electronic sensor utilizing optical fiber technology to detect an event. Fiber optic sensors can detect an event via one or more measurements (e.g., metrics) including, but not limited to, strain, temperature, pressure, and the like. Traditional and proprietary measurements can be utilized to identify an event, including, but not limited to, intensity variance, phase modulation, polarization, wavelength modification, latency, and the like. It should be appreciated that the fiber optic sensor can be an intrinsic, extrinsic sensor, and/or any combination thereof.

An event can be an occurrence of a phenomenon within a surveilled area. The event can be associated with one or more objects, entities, persons, and the like. The event can include, but is not limited to, a stationary event, a dynamic event (e.g., moving), and the like. For example, an event can be an audible trigger such as a car alarm siren.

In step 110, event information can be conveyed to a surveillance entity. The surveillance entity can include, but is not limited to, a surveillance engine, a video management system, and the like. In one instance, event information can be conveyed to an IBM SMART SURVEILLANCE ENGINE. Event information can include, but is not limited to, timing information, geographic information, sensor measurements, and the like. For example, event information can include the time and location an event is detected within a surveilled area.

In step 115, the location of an event can be determined. The location of the event can be determined based on an analysis of event information. Event information analysis can include traditional analysis, proprietary analysis, and any combination thereof. In step 120, if the event is within the field of view of a selected camera, the method can proceed to step 130, else continue to step 125. Camera selection can be performed utilizing proximity, field of view, and the like. Proximity can include, but is not limited to proximity to an event, proximity to surveilled area, and the like.

In one embodiment, when an event is not visible due to objects within the field of view (e.g., trees, cars, etc) obscuring the event, additional cameras can be recruited. In the embodiment, an intelligent camera selection algorithm can be utilized to determine an optimal proximate camera to surveil the event.

In step 125, the field of view of the selected camera can be adjusted. The adjustments can include, but are not limited to, pan, tilt, zoom, mode switching, and the like. Mode switching can include, but is not limited to, infrared activation (e.g., thermal imaging), image intensification (e.g., night vision), and the like. In step 130, video analytics can be optionally performed. Video analytics can include, but are not limited to, object identification, object behavior analysis, object tracking, motion detection, facial recognition, and the like. In step 135, a security action can be optionally enacted. Security actions can include, but are not limited to, recruitment of additional cameras, notification of personnel, activation of security mechanisms (e.g., alarms), and the like.

In step 140, if another event is detected, the method can return to step 110, else continue to step 145. Repetition of steps 110-140 can permit active (e.g., real-time) tracking of an event within a surveilled area. In step 145, the selected camera can optionally return to a default pathing/position. In one embodiment, the selected camera can return to a historic position (e.g., home position). In another embodiment, the selected camera can iteratively repeat adjustments resulting from the method. In the embodiment, adjustments can create a new camera pathing which can be utilized to observe the surveilled area for event reoccurrences. For example, a camera can oscillate, allowing the field of view of the camera to surveil a home position (e.g., gate) and a position associated with an event occurrence (e.g., wall).

Drawings presented herein are for illustrative purposes only and should not be construed to limit the invention in any regard. Method 100 can be performed in real-time or near real-time. It should be appreciated that method 100 can utilize multiple cameras to perform surveillance within a surveilled area. It should be understood that method 100 can be employed when an event occurs inside and/or outside a camera field of view.

Figure 2:
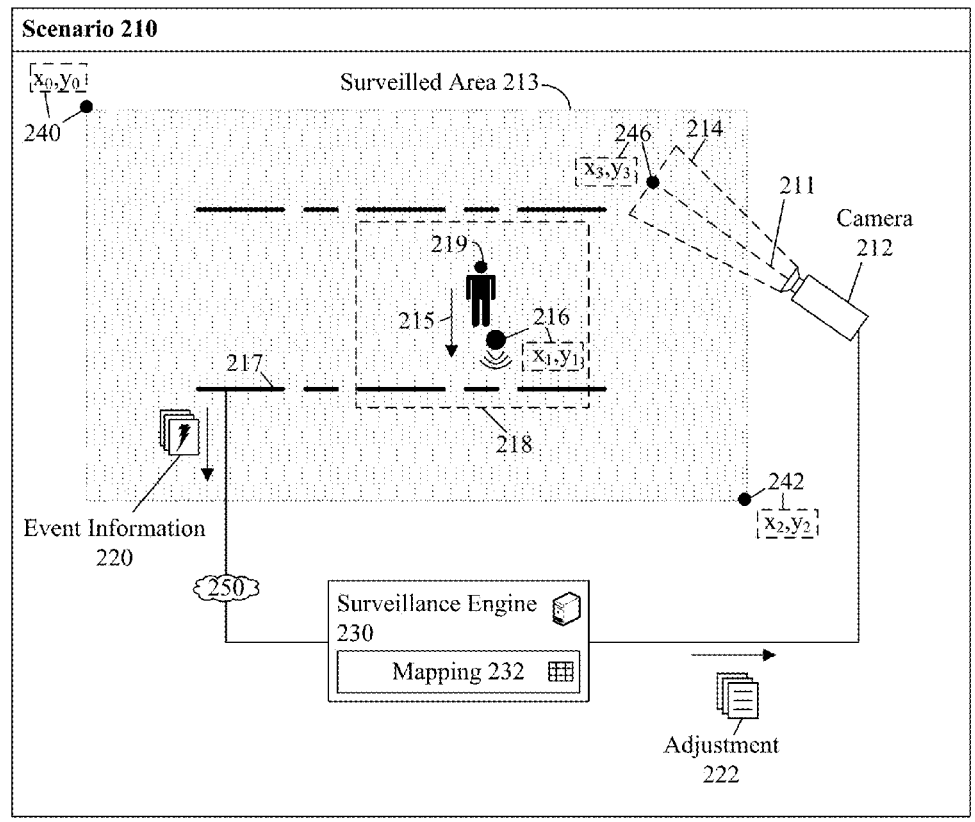
FIG. 2 is a schematic diagram illustrating a scenario for detecting and monitoring event occurrences using fiber optic sensors in accordance with an embodiment of the inventive arrangements disclosed herein.

FIG. 2 is a schematic diagram illustrating a scenario 210 for detecting and monitoring event occurrences using fiber optic sensors in accordance with an embodiment of the inventive arrangements disclosed herein. Scenario 210 can be enacted in the context of method 100. In scenario 210, fiber optic sensor 217 embedded within surveilled area 213 can be communicatively linked with a surveillance engine 230 via network 250. Sensor 217 can detect event 218 and communicate event information 220 to engine 230. Engine 230 can process event information and can determine an appropriate location of event. Engine 230 can convey adjustment 222 to camera 212. Adjustment 222 can dynamically alter camera 212 field of view 214 to observe event 218.

In the scenario, an event 218 occurring outside the field of view 214 can trigger a camera 212 adjustment resulting in camera 212 observing event 218. For instance, an intruder 219 can be detected at location 216 within a secure area 213 can be monitored as the intruder 219 moves in direction 215.

Fiber optic sensor 217 can be linked to engine 230 which can communicate event information in real-time. Network 250 can be a wired network, wireless network and the like. In one instance, sensor 217 can be linked via fiber optic technology engine 230. Fiber optic sensor 217 can be proximately located within surveilled area 213. In one instance, sensor 217 can be embedded into a horizontal surface (e.g., the ground) of surveilled area 213. In another instance, sensor 217 can be embedded into a vertical surface (e.g., walls, doors) of surveilled area 213. Sensor 217 layout can conform to traditional and/or proprietary layouts including, but not limited to, in parallel (e.g., lines), perpendicular (e.g., grids), and the like.

In one embodiment, sensor 217 can be a fiber Bragg grating. In the embodiment, grating structure can include, but is not limited to, uniform positive-only index change, Gaussian apodized, raised-cosine apodized, chirped, discrete phase shift, superstructure, and the like.

Surveilled area 213 can conform to any shape including, but not limited to, polygons, free form shapes, and the like. Surveilled area 213 can be formed from stationary boundaries, dynamic boundaries, and the like. Area 213 can be manually and/or automatically established. In one instance, surveilled area 213 can expand and/or contract as resources are distributed throughout area 213. For instance, when a car is parked proximate to a perimeter of area 213, area 213 can be dynamically extended to accommodate adequate surveillance of the car.

In one embodiment, surveilled area 213 can be mapped to a Cartesian coordinate system with coordinates 240 (e.g., $x_0$, $y_0$), 242 (e.g., $x_2$, $y_2$). It should be noted that surveilled area can be a three-dimensional volume and is not be limited to a two-dimensional area described herein.

Engine 230 can be proximately and/or remotely located from surveilled area 213. For instance, engine 230 can be an on-site system capable of communicating adjustment 222 to camera 212 field of view 214 in real-time. In one embodiment, engine 230 can be an off-site component able to rapidly perform responsive surveillance actions. Engine 230 can utilize mapping 232 to perform relevant camera adjustments in response to event 218 detection.

Mapping 232 can be one or more datasets able to track camera 212 state (e.g., field of view 214) orientation. Mapping 232 can include, but is not limited to, camera identifier, camera location, field of view dimensions, field of view location, status, zone information, and the like. In one instance, mapping 232 can permit identification of proximate camera. In another instance, mapping 232 can be utilized to determine field of view 214 observational area within surveilled area 213. In the instance, a center axis 211 of the field of view 214 can be utilized to determine field of view observable area. For example, adjusting field of view 214 from a position (e.g., x3, y3) and aligning (e.g., centering) axis 211 upon location 216 can permit optimal observation of event 218. It should be noted that field of view 214 can be oriented in one or more traditional and/or proprietary fashions. It should be appreciated that camera 212 can operate in three dimensions and should not be limited to the two dimensional exemplary solution disclosed herein.

In one instance, mapping 232 can be associated with Global Positioning System (GPS) information. In the instance, GPS data (e.g., latitude/longitude) can be utilized to determine an event location which a camera can be adjusted to observe.

In one embodiment, current camera positioning can be identified via mapping 232 and algorithmic calculations can be utilized to determine relevant adjustment values. In the embodiment, adjustment values can be numeric quantities which can include, but are not limited to, degrees, radians, real numbers, and the like.

Adjustment 222 can be a digital artifact for automatically modifying a camera 212 operation. Adjustment 222 can include a camera operation, an operation modifier, status request, and the like. Adjustment 222 can include macro-adjustments, micro-adjustments, and the like. For instance, adjustment 222 can be a "zoom 1" command modifying camera zoom by one power of magnification. Adjustment 222 can include, but is not limited to, pan, tilt, zoom, and the like. In one embodiment, adjustment 222 can include a single camera adjustment (e.g., pan command). In the embodiment, successive adjustment 222 can be conveyed to the camera 212 to perform serial camera 212 adjustment. As camera 212 is adjusted via adjustment 222, mapping 232 can be updated. For instance, when camera 212 (e.g., Cam_A) is adjusted to observe event 218, the field of view information of entry 234 can be updated from an initial position (e.g., x3, y3) to a location 216 (e.g., x1, y1).

In one instance, adjustment 222 can be a series of camera commands able to adjust the camera 212 field of view 214 from a static reference point (e.g., home position). In another instance, adjustment 222 can be a series of commands able to adjust the camera 212 field of view 214 from a dynamic reference point (e.g., current/historic position).

Drawings presented herein are for illustrative purposes only and should not be construed to limit the invention in any regard. It should be understood that information 220 and adjustment 222 can conform to any traditional and/or proprietary format. Information 220, adjustment 222 can be digitally encrypted utilizing conventional and non-conventional mechanisms. It should be noted that components (e.g., camera 212) within scenario 210 can be communicatively linked via one or more traditional and/or conventional mediums. Mediums can include, but are not limited to, twisted pair (e.g., Ethernet), coaxial, optical fiber, and the like.

Figure 3:
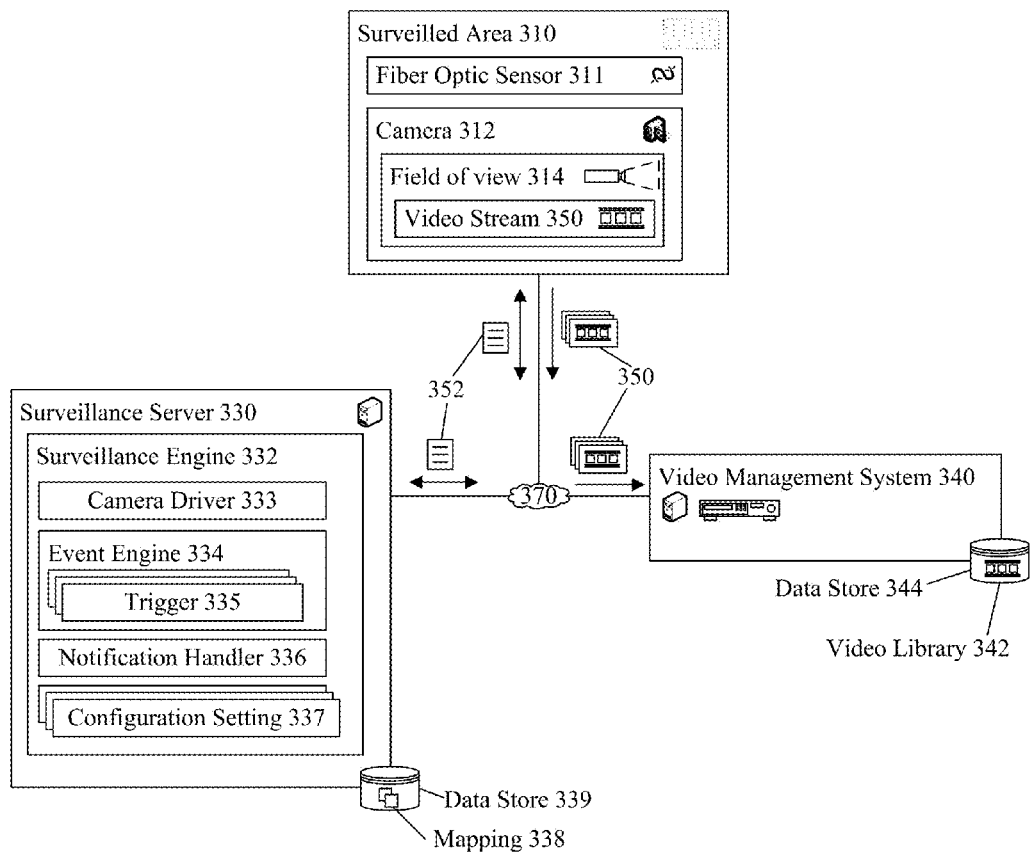
FIG. 3 is a schematic diagram illustrating a system for detecting and monitoring event occurrences using fiber optic sensors in accordance with an embodiment of the inventive arrangements disclosed herein.

FIG. 3 is a schematic diagram illustrating a system 300 for detecting and monitoring event occurrences using fiber optic sensors in accordance with an embodiment of the inventive arrangements disclosed herein. System 300 can be present in the context of method 100 and/or scenario 210. In system 300, a surveillance server can permit dynamic real-time camera 312 adjustments in response to an event detected by sensor 311 within surveilled area 310. Once adjusted to observe an event, video stream from camera 316 can be conveyed to video management system 340. System 340 can store video stream within a data store 344 creating a video library 342 which can be utilized in one or more traditional and/or conventional manners.

Surveillance server 330 can be a hardware/software entity for automatically monitoring a surveilled area in response to a detected event. Server 330 can include, but is not limited to, surveillance engine 332, data store 339, and the like. In one embodiment, server 330 can be a component of a Service Oriented Architecture (SOA). In one instance, surveillance server 330 can be an IBM SMART SURVEILLANCE SERVER.

Surveillance engine 332 can be a hardware/software entity able to perform real-time adaptive surveillance utilizing dynamic camera adjustment capabilities. Engine 332 can include, but is not limited, event engine 334, notification handler 336, configuration setting 337, and the like. In one embodiment, engine 332 can be a component of a video management system 340. It should be appreciated that engine 332 can operate in real-time permitting dynamic active surveillance of a detected event through versatile camera 312 adjustments.

Camera driver 333 can be a hardware/software component permitting camera 312 adjustment in real-time. Driver 333 can be utilized to track camera 312 type, camera 312 functionality, camera 312 location, field of view 314, status (e.g., active tracking), and the like. In one instance, driver 333 can permit a bi-directional communication link between server 330 and a camera 312 to be established. In the instance, active camera 312 tracking can permit real-time dynamic surveillance of an event detected by sensor 311. For instance, as camera 312 field of view 314 is adjusted, camera status (e.g., tracking) can be communicated to driver 333 enabling real-time feedback. In one instance, camera information (e.g., type, functionality, status) can be dynamically determined from camera 312 via adjustment 352.

In one embodiment, driver 333 can utilize mapping 333 to coordinate multiple camera surveillance simultaneously. Mapping 333 stored within data store 339 can be dynamically accessed and/or updated to permit cameras within surveilled area 310 to operate collectively.

In one instance, driver 333 can permit intelligent camera selection for performing surveillance. In the instance, when a camera is performing surveillance in response to a detected event, the camera status can be updated to reflect the camera status (e.g., unavailable). In this way, intelligent selection of cameras can be enabled by recruiting cameras which are available (e.g., not observing a detected event).

Event engine 334 can be a hardware/software entity capable of determining event relevance and event response. Event engine 334 can include, but is not limited to, trigger 335, zone settings, security actions, and the like. Engine 334 can receive event information (not shown) from sensor 311 and can initiate an appropriate response. Engine 334 can perform event information analysis to determine event relevance. For instance, pressure information within event information can be analyzed to determine when an event is likely. In one instance, event engine 334 can utilize trigger 335 to initiate an automated response.

Trigger 335 can be one or more rulesets for responding to a detected event. Rulesets can include, but are not limited to, camera adjustment rules, user notification policies, security action rules, and the like. Trigger 335 can include, but is not limited to, a condition, event, state, threshold value, and the like. For instance, a trigger 335 can initiate a camera adjustment when event information indicates a pressure change has occurred within a surveilled area 310. Conditions can include, but are not limited to, object detection, motion detection, directional movement, and the like. Trigger 335 can be automatically and/or manually established based on configuration settings of system 330. In one instance, trigger 335 can be a portion of a database trigger within a database.

In one embodiment, trigger 335 can be established to selectively ignore event detection. In the embodiment, detected periodic events can be optionally suppressed. For instance, events associated with a security guard patrolling a surveilled area 310 can be selectively omitted from triggering security actions.

Notification handler 336 can be a hardware/software component for enacting notification actions within system 300. Handler 336 can convey component notifications (e.g., status updates), user notifications, and the like. For example, handler 336 can present a notification within a user interface when an event is detected. In one instance, notification handler 336 can communicate notifications to external entities including, but not limited to, security agencies, law enforcement organizations, medical institutions, and the like. Handler 336 can utilize conventional and/or non-conventional notification mechanisms. Notification mechanisms can include, but is not limited to, voice communication, electronic mail, Short Message Service, Instant Message, facsimile, and the like.

Configuration setting 337 can be one or more rulesets for establishing the behavior of system 330 and/or system 300. Setting 337 can include, but is not limited to, user established settings, heuristically determined settings, triggers, security profiles, and the like. Setting 337 can be utilized to configure engine 332 components including, but not limited to, camera driver 333, event engine 334, notification handler 336, and the like. Setting 337 can be dynamically altered enabling real-time customization of system 300 components.

Video stream 350 can be a sequence of still images representing real-time activity within surveilled area 310. Video stream 350 can include traditional and/or proprietary characteristics including, but not limited to, frame rate, interlacing, resolution, hue space, compression, bit rate, and the like. Stream 350 can conform to one or more formats including, but not limited to, Motion Picture Experts Group 4 (MPEG-4), Audio Video Interlace (AVI), and the like. It should be appreciated that video stream 350 can be conveyed to system 340, system 330, and additional components not shown within system 300. In one embodiment, stream 350 can be encrypted and/or associated with additional security mechanisms.

Video management system 340 can be a digital asset management entity capable of storing video stream 350. System 340 can include, but is not limited to, video library, 342, data store 344, and the like. In one instance, video management system 340 can be a component of a content management system (CMS).

Video library 344 can be a collection of video streams associated with surveilled area 310. Library 344 can include, but is not limited to, video stream 350, historic video streams, metadata (not shown), search index (not shown), keyword tags (not shown), and the like. In one instance, a video stream 350 associated with a detected event can be stored within video library 342. In the instance, a video stream can be indexed against keywords, triggers, and the like. In one embodiment, video library 344 can permit keyword tagging of video content. In the embodiment, a keyword tag can be associated with a portion of a video stream within library 342.

Data store 339, 344 can be hardware/software entities able to persist system 300 data. Data store 339, 344 can be a component of a Storage Area Network (SAN), Network Area Storage (NAS), and the like. Data store 339 can store mapping 338, event history, and the like. Data store 339, 344 can be a portion of a Relational Database Management System (RDBMS), Object Oriented Database Management System (OODBMS), and the like.

Drawings presented herein are for illustrative purposes only and should not be construed to limit the invention in any regard. System 300 can be associated with one or more user interfaces including, but not limited to, a graphical user interface, voice user interface, mixed-mode interface, text-based interface, and the like. In one instance, video stream 350 can be presented in real-time within an interface when an event is detected within surveilled area 310. In one embodiment, components of system 300 can be a portion of a Software as a Service (SaaS). System 300 can be associated with a distributed computing environment, network computing infrastructure, cloud computing environment, and the like. In one instance, system 300 can be associated with an IBM MIDDLEWARE FOR LARGE SCALE SURVEILLANCE entity.

It should be understood that system 300 can be associated with traditional and/or proprietary communication protocols and/or mechanisms. In one embodiment, system 300 can be associated with a Transmission Control Protocol/Internet Protocol (TCP/IP), User Datagram Protocol (UDP), Real-time Streaming Protocol (RTP), and the like.

The flowchart and block diagrams in the FIGS. 1-3 illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be run substantially concurrently, or the blocks may sometimes be processed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

What is claimed is:

1. A method for dynamically adjusting a camera in response to detecting an event comprising:
    detecting in real-time an event within a surveilled area, wherein the event is outside the field of view of a camera associated with the surveilled area, wherein the event is detected by a fiber optic sensor associated with the surveilled area, wherein the fiber optic sensor measures a metric associated with the event, wherein the surveilled area is a physically bounded region;
    receiving event information associated with the event, wherein the event information is at least one of a timing information, a sensor measurement, and a location information;
    determining an adjustment operation associated with the camera, wherein the adjustment operation is determined utilizing a mapping and the event information, wherein the adjustment operation is associated with a camera functionality and an adjustment value, wherein the mapping comprises a camera identification value, a camera location, and a field of view dimension; and
    dynamically adjusting the field of view of the camera, wherein the adjusting results in the location of the event is within the field of view, wherein the adjusting is at least one of a pan, tilt, and zoom functionality, wherein the detecting, the receiving, the determining, and the dynamically adjusting are performed by one or more processors executing program instructions, which are stored on a non-transitory storage medium, wherein the program instructions are part of an IBM SMART SURVEILLANCE SERVER.

2. The method of claim 1, wherein the metric is at least one of pressure, strain, and temperature.

3. The method of claim 1, wherein the location coordinate value is at least one of a Global Positioning System (GPS) coordinate, and a Cartesian coordinate value.

4. The method of claim 1, wherein the fiber optic sensor is embedded within a surface associated with the surveilled area.

5. The method of claim 1, wherein the method actively tracks an object moving within the surveilled area.

6. The method of claim 1, further comprising:
receiving a real-time video stream from the camera responsive to the adjusting; and
performing at least one video analytic on the video stream, wherein the video analytic is at least one of an object identification, motion detection, and face detection.

7. The method of claim 6, further comprising:
conveying a user notification to an interface associated with a computing device utilized by a user responsive to the performing.

8. The method of claim 1, further comprising:
initiating at least one security action responsive to the event, wherein the security action is at least one of a communicating a notification to an external entity, wherein the external entity is at least one of a security agency, a law enforcement organization, and a medical institution.

9. The method of claim 1, wherein the camera is an Internet Protocol camera.

10. The method of claim 1, wherein the fiber optic sensor is a Bragg grating.

11. A system for dynamically adjusting a camera in response to detecting an event comprising:
a processor;
a volatile memory;
a bus connecting said processor, non-volatile memory, and volatile memory to each other, wherein the volatile memory comprises computer usable program code execute-able by said processor, said computer usable program code comprising:
a surveilled area comprising of a physically bounded region and a fiber optic sensor within the surveilled area able to detect an event, wherein the fiber optic sensor can receive a measurement associated with the event, wherein the measurement is at least one of a pressure, strain, and temperature;
a surveillance engine able to identify a camera proximate to the event and communicate a camera adjustment operation to the proximate camera resulting in the modifying of the proximate camera state, wherein the surveillance engine is a component of an IBM MIDDLEWARE FOR LARGE SCALE SURVEILLANCE entity;
a proximate camera with a field of view configured to convey a video stream within the surveilled area to a video management system, wherein the video stream is video information associated with the field of view, wherein the proximate camera is a capable of at least one adjustment operation, wherein the adjustment operation is a pan, tilt, and zoom functionality modifying the field of view; and
a mapping capable of tracking the proximate camera state, wherein the proximate camera state is at least one of a camera identification, camera location, and a camera field of view dimension.

12. The system of claim 11, further comprising:
a trigger able to initiate a security action in response to the event, wherein the trigger is associated with at least one of a proximate camera state and a threshold value.

13. The system of claim 11, further comprising:
a camera driver able to identify at least one of a camera type, a camera functionality, and a camera state.

14. The system of claim 11, wherein the camera is an Internet Protocol camera.

15. The system of claim 11, wherein the surveillance engine is an IBM SMART SURVEILLANCE ENGINE.

16. A computer program product comprising a non-transitory computer readable storage medium having computer usable program code embodied therewith, the computer usable program code comprising:
computer usable program code stored in a non-transitory storage medium, when said computer usable program code is handled by a processor it is operable to detect in real-time an event within a surveilled area, wherein the event is outside the field of view of a camera associated with the surveilled area, wherein the event is detected by an fiber optic sensor associated with the surveilled area, wherein the fiber optic sensor measures a metric associated with the event, wherein the surveilled area is a physically bounded region;
computer usable program code stored in a non-transitory storage medium, when said computer usable program code is handled by a processor it is operable to receive event information associated with the event, wherein the event information is at least one of a timing information, a sensor measurement, and a location information;
computer usable program code stored in a non-transitory storage medium, when said computer usable program code is handled by a processor it is operable to determine an adjustment operation associated with the camera, wherein the adjustment operation is determined utilizing a mapping, wherein the adjustment operation is associated with a camera functionality and an adjustment value, wherein the mapping comprises a camera identification value, a camera location, and a field of view dimension; and
computer usable program code stored in a non-transitory storage medium, when said computer usable program code is handled by a processor it is operable to dynamically adjust the field of view of the camera, wherein the adjusting results in the location of the event is within the field of view, wherein the adjusting is at least one of a pan, tilt, and zoom functionality, wherein the computer program product is a component of an IBM SMART SURVEILLANCE SERVER.

17. The computer program product of claim 16, wherein the computer program product is associated with a user interface, wherein the user interface permits modification of at least one of a surveilled area, a mapping, and a trigger.

18. The computer program product of claim 16, further comprising:
computer usable program code stored in a non-transitory storage medium, when said computer usable program code is handled by a processor it is operable to receive a real-time video stream from the camera responsive to the adjusting; and
computer usable program code stored in a non-transitory storage medium, when said computer usable program code is handled by a processor it is operable to perform at least one video analytic on the video stream, wherein the video analytic is at least one of an object identification, motion detection, and face detection.

* * * * *